June 11, 1935.  O. NIEDERER  2,004,339
EGG GRADING SCALE
Original Filed Aug. 11, 1933   3 Sheets-Sheet 1
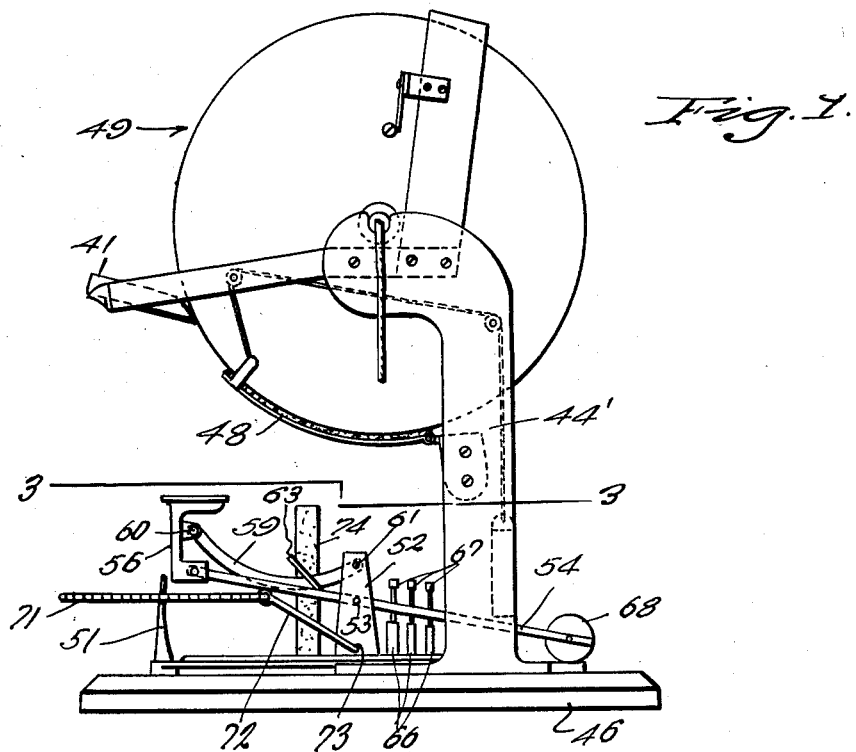
Fig. 1.
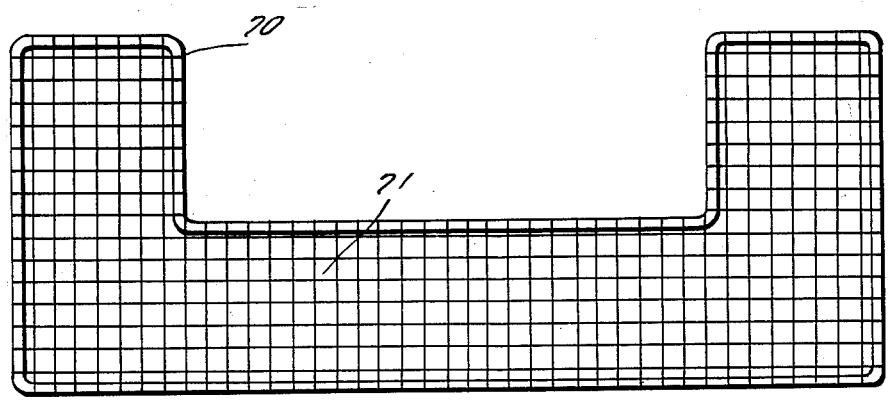
Fig. 10.
Fig. 9.
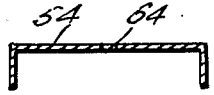
Inventor
O. Niederer
By Clarence A. O'Brien
Attorney June 11, 1935.  O. NIEDERER  2,004,339

EGG GRADING SCALE

Original Filed Aug. 11, 1933    3 Sheets-Sheet 2

Inventor
O. Niederer
By Clarence A. O'Brien
Attorney

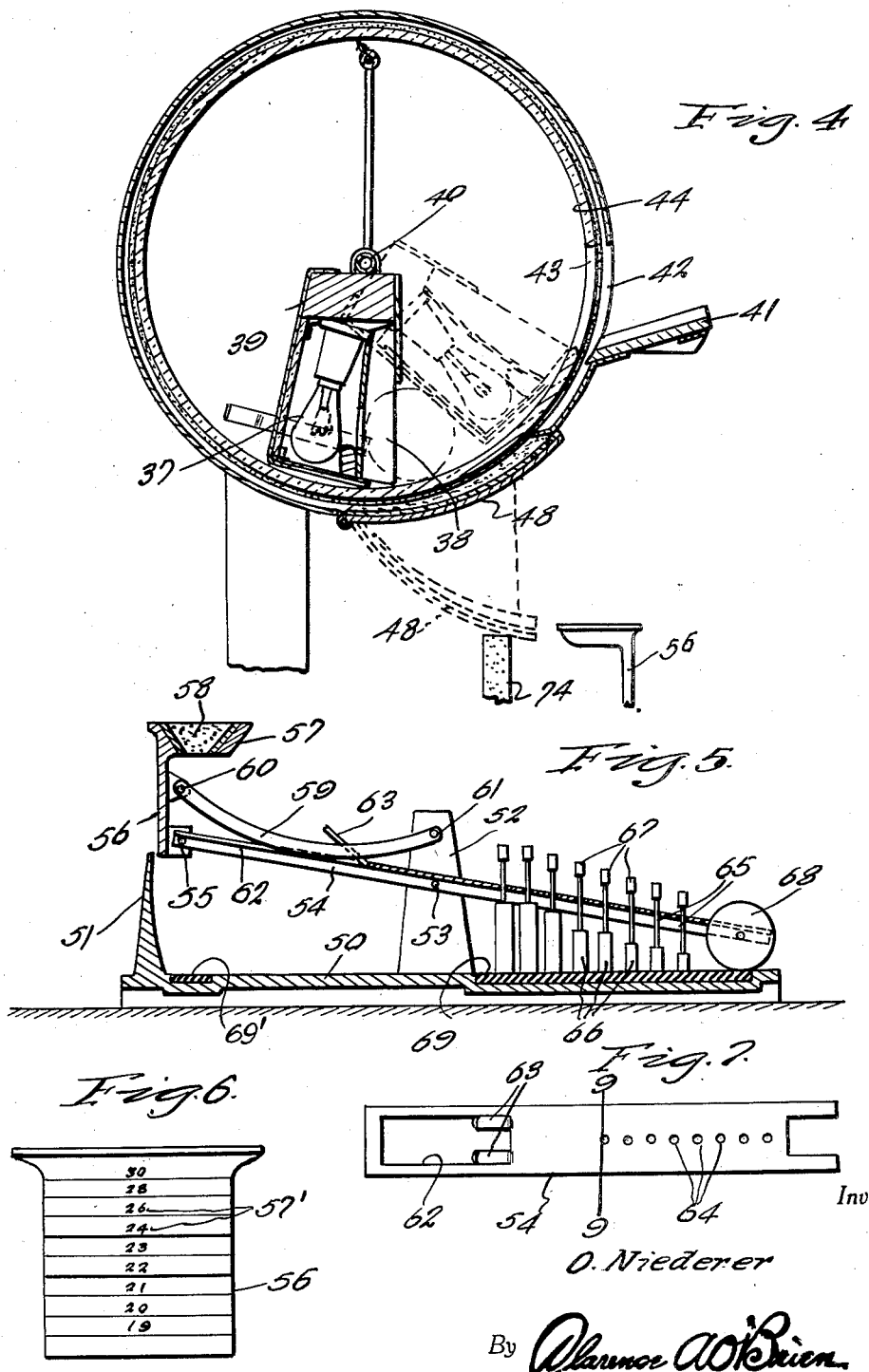

Patented June 11, 1935

2,004,339

UNITED STATES PATENT OFFICE 2,004,339

EGG GRADING SCALE

Otto Niederer, Titusville, N. J.

Original application August 11, 1933, Serial No. 684,719. Divided and this application May 28, 1934, Serial No. 728,009

3 Claims. (Cl. 265—48)

This invention relates to a device for candling and grading eggs and more particularly to an improved construction of scale for use with a candling device for the purpose of weighing and grading eggs at one and the same time.

The present application has particular reference to the egg weighing and grading scale divided out of my co-pending application Serial No. 684,719 filed August 11, 1933 for an egg candler and grader combined.

The present invention together with its objects and advantages will be understood from a study of the following description taken in connection with the accompanying drawings wherein:

Figure 1 is a side elevational view illustrating the application of the invention.

Figure 3:
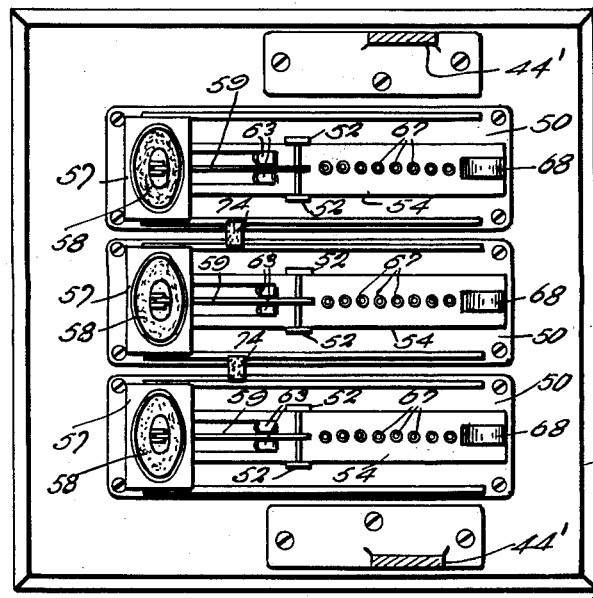
Figure 3 is a sectional view taken on line 3—3 of Figure 1.
Figure 2:
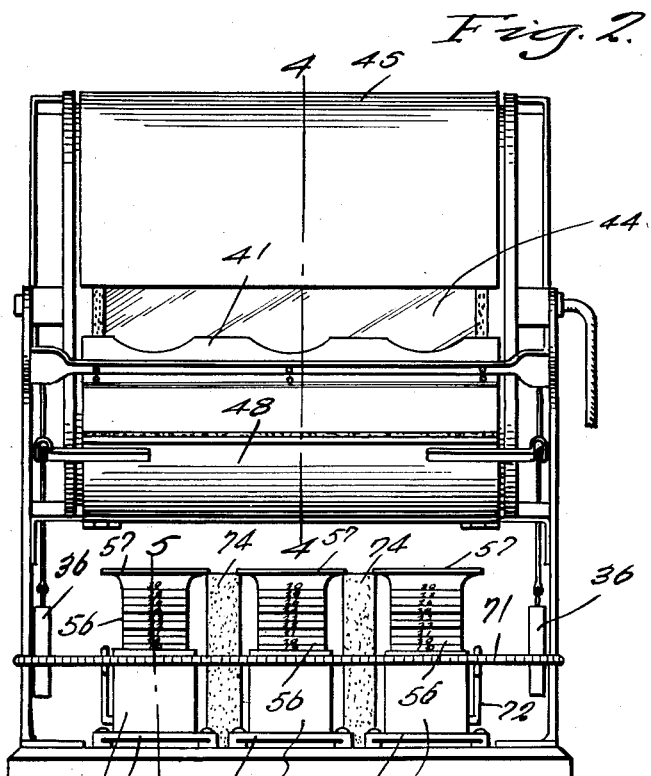
Figure 2 is a front elevational view.

Figures 4 and 5 are sectional views taken substantially on the line 4—4 and 5—5 respectively of Figure 2.

Figure 6 is a front elevational view of the scale tray.

Figure 7 is a plan view of a rockable member forming part of the grading scale.

Figure 8:
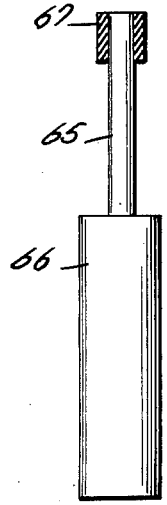

Figure 8 is an elevational view of one of the weights.

Figure 9 is a sectional view taken substantially on the line 9—9 of Figure 7, and Figure 10 is a plan view of a net.

Referring to the drawings by reference numerals it will be seen that in accordance with the present invention a number of grading scales determined by the capacity of the candling device 49 will be employed. Each of the grading scales includes an elongated base plate 50 having at its forward end an upstanding part 51. Between its ends there rises vertically from the base plate 50 standards 52 between which is pivoted as at 53 an elongated bar 54.

Pivotally mounted on the forward end of the bar 54 as at 55 is a scale plate 56 provided with graduations 57'. The graduations are in terms of ounces and the upper edge of the member 51 serves as an index to be read against the graduations to indicate the weight, in ounces, of an egg discharged from the chute 48 on to the scale tray 57 suitably provided on the upper end of the plate 56.

The tray 57 is of suitable shape and is provided with suitable padding 58.

For maintaining the plate 56 vertical and the tray 57 in a horizontal position there is provided an arcuate link 59 which is pivoted at one end to the plate 56 as at 60, and at a relatively opposite end is pivoted between the standards 52 as at 61. The intermediate portion of the link 59 is accommodated in a slot 62 provided in the forward end of the plate or bar 54, and at one end of the slot there rises inclined fingers 63, disposed at opposite sides of the links 59, and these fingers serve to prevent undue lateral movement of the link 59.

At its rear end the plate 54 is provided with a series of apertures 64 to accommodate the shanks 65 of weights 66. The weights are of various sizes and progressively increase in size inwardly from the rear end of the plate 54. To engage the plate 54 upon swinging movement thereof under the weight of an egg in the tray 57 the shanks 65 of the weight are provided at their upper end with heads 67 of rubber or other suitable material.

Normally the weights 66 rest on a cushion 69 of rubber or other suitable material fitted in a suitable depression provided in the plate 50. Said plate 50 at its forward end is also provided with a mat 69', or the like, of rubber, while the rear end of what may be termed the balance bar 54 is provided with a roller 68.

To catch such eggs as might fall from the scale trays 57 there is provided a removable net which is substantially U-shaped and comprises a frame 70 to which is suitably secured a sheet of reticulated material, preferably netting 71. The net is applied to the device in a manner clear from Figures 1 and 2. In this connection it will be noted that the vertical plates 51 are provided adjacent their upper edges, and at their outer side edges with notches to accommodate the inner portions of the frame 70 at the sides thereof. Links 72 are connected at one end with the free ends of the sides of the frame 70, and at opposite ends the links are connected as at 73 to the outside standards 52 of the endmost scales.

For the chute 48 of the egg candling device there are provided vertical stops or bumpers 74 of rubber or other suitable material, the bumpers 74 rising from the base 46, being at their lower ends suitably anchored to the base.

In the present instance I have shown the egg grading and weighing scales used in conjunction with an egg candler embodying the subject matter of the herein identified parent application. For a sufficient understanding of the present invention it may be stated that the candling device 49 herein illustrated includes among other parts an outer casing 45 supported between suitable standards 44' rising from the base 46, on which base are also arranged the scales as clearly shown.

Mounted to revolve within the casing 45 is a transparent drum 44 provided with openings 43 adapted to aline with openings 42 provided in the peripheral wall of the casing 45 to receive into the drum eggs placed on a suitably located shelf 41.

Arranged within the drum 44 for rotation relative to the drum about the axis 40 of the drum is a combined egg support and stop 39 which in one face is provided with recesses 38 adapted to accommodate the eggs and arranged behind the recesses are electric lamps 37, it being noted that the wall of the member 39 provided with the recesses 38 is also suitably apertured to permit the light rays from the lamps 37 to shine therethrough in order that one may readily locate any imperfection in the eggs. It will also be noted that the casing 45 is provided with the discharge chute or door 48 upon which, after the candling operation has been completed, the candled eggs are deposited, and this door or chute, under weight of the eggs swings downwardly from the full line position shown in Figure 4 to the dotted line position for depositing the candled eggs on to the trays 57 of the scales. For returning the chute or tray 48 to its normal position suitable weights 36 are provided and suitably connected therewith through the medium of cables trained over pulleys suitably located and mounted at opposite sides of the candling device. A more detailed description of the candling device per se is thought unnecessary.

Having thus described my invention, what I claim as new is:

1. For use with an egg candling device a scale comprising a base having a vertical index rising therefrom, a plate pivotally mounted intermediate its ends on the base and provided at one end with a receiving plate, and a vertical scale plate rising from the pivoted plate and supporting the egg tray, said scale plate being provided with a vertical scale graduated in terms of ounces and against which the upper edge of the index is readable, and weights on the end of the pivoted plate remote from the egg tray.

2. An egg weighing and grading scale comprising a base having a vertical index rising therefrom, a balance bar pivotally supported above the base, a scale plate pivotally connected at one end with the balance bar, and provided on one face with a vertical scale graduated in terms of ounces and against which the index is readable, an egg receiving tray carried by the scale plate, a pivotally mounted link having a pivotal connection at one end with the scale plate for holding the latter in vertical position, and a series of weights loosely connected with the end of the balance bar remote from the scale plate.

3. A scale of the character described comprising a base plate, a vertical index rising from the base plate at one end thereof, a pair of standards rising from the base plate intermediate the ends thereof, a balance bar pivotally mounted intermediate the ends between the standards, a scale plate pivotally connected at one end to the balance bar and provided with an egg receiving tray, a link pivotally connected at one end to the standards and at a relatively opposite end to the scale plate for normally retaining the scale plate in vertical position, said scale plate being provided on one face thereof with a vertical series of graduations against which the index is readable, and a series of weights having shanks slidable through openings in the free end of the balance bar and heads on the upper ends of the shank to engage the top face of the balance bar, said link being arcuate and said balance bar provided with a longitudinal slot to accommodate the link, and at one end of the slot with fingers disposed at opposite sides of the link for limiting lateral play of the latter.

OTTO NIEDERER.